United States Patent
Wyatt et al.

(10) Patent No.: US 8,325,193 B1
(45) Date of Patent: Dec. 4, 2012

(54) SYSTEM AND METHOD FOR DETERMINING OPTIMAL GPU INITIALIZATION ORDER IN A MULTIPLE-GPU SYSTEM

(75) Inventors: David Wyatt, San Jose, CA (US); Praveen Prakash, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 631 days.

(21) Appl. No.: 12/550,112

(22) Filed: Aug. 28, 2009

(51) Int. Cl.
G06F 13/14 (2006.01)
G06F 15/16 (2006.01)

(52) U.S. Cl. ........................ 345/519; 345/502

(58) Field of Classification Search .............. 345/501, 345/502, 503, 504, 505, 519
See application file for complete search history.

(56) References Cited

U.S. PATENT DOCUMENTS 6,513,114 B1 * 1/2003 Wu et al. ........................ 713/2
2007/0239913 A1 * 10/2007 Knepper et al. ............. 710/104
* cited by examiner Primary Examiner — Jacinta M Crawford
(74) Attorney, Agent, or Firm — Patterson & Sheridan, L.L.P.

(57) ABSTRACT

One embodiment of the invention sets forth a mechanism for controlling the initialization order of an iGPU and a dGPU in a hybrid graphics processing environment to ensure that the iGPU is recognized by the operating system as the primary GPU. When the device initialization request associated with the dGPU is received, the interface module determines whether the iGPU has already been initialized. If the iGPU has already been initialized, then the interface module transmits the device initialization request to the dGPU driver for dGPU initialization. However, if the iGPU flag indicates that the iGPU has not yet been initialized, then the interface module terminates the device initialization request and transmits an initialization failure notification to the operating system. In such a manner, the dGPU is initialized only after the iGPU has previously been initialized, thereby ensuring that the iGPU is recognized by the operating system as the primary GPU.

20 Claims, 3 Drawing Sheets

001 # SYSTEM AND METHOD FOR DETERMINING OPTIMAL GPU INITIALIZATION ORDER IN A MULTIPLE-GPU SYSTEM

BACKGROUND OF THE INVENTION

1. Field of the Invention

The present invention relates generally to the field of graphics processing and, more specifically, to a system and method for determining the optimal graphics processing unit (GPU) initialization order in a multiple-GPU system.

2. Description of the Related Art

In conventional computer systems, the processing power of a central processing unit (CPU) may be augmented by a co-processor, such as a GPU. GPUs are specialized processors that are configured to efficiently perform graphics processing operations or other operations that would otherwise be performed by the CPU. Some conventional computer systems are configured with a hybrid graphics system that includes, for example, an integrated GPU (iGPU) disposed on the motherboard along with the CPU and a discrete GPU (dGPU) located on an add-in card that is connected to the motherboard via a Peripheral Component Interconnect Express (PCI Express or PCIe) expansion bus and slot.

In a hybrid graphics system, the iGPU and the dGPU operate in concert to perform different graphics processing operations. This arrangement is created to provide a graphics processing environment combining the inherently lower-power, longer battery-life of the iGPU with the higher performance dGPU, giving the user the best of both worlds. The iGPU is typically configured as the primary GPU, i.e., optimized for lower power consumption and longer battery-life and is the default adapter controlling critical graphics resources, such as the legacy VGA interface on which boot time power-on self-test and critical operating system messages are displayed, backlight control, hot-key display switch control and other interfaces as defined within the Advanced Configuration and Power Interface (ACPI). The iGPU is also coupled to the Video Graphics Array (VGA) adaptor of the computer system. The dGPU supplements the iGPU by providing the augmented graphics processing capabilities necessary for many different types of computationally intensive applications, including three-dimensional (3D) rendering and video gaming. However in order to realize the battery-life capabilities of the iGPU, the dGPU must be shutdown or placed into a low power mode when not in use. This transition may, for example be initiated by the user selecting a system policy preference for long battery-life, via a physical switch that allows selecting iGPU versus dGPU operating modes, or by removing the A/C mains power cord i.e. switching to battery power.

When a computer system configured with a hybrid graphics system is turned on, the order in which the iGPU and the dGPU are initialized by the operating system is non-deterministic, i.e., either GPU may be initialized first. Importantly, some operating systems may recognize the GPU that initializes as the Legacy VGA adapter as being the primary GPU. However other operating systems or other functionality within the operating system may instead recognize the first GPU adapter driver based on the Plug & Play order which may place the VGA adapter first if the devices are located on different busses or enumerated on those busses in different order. The net effect is a misalignment between the adapter initialized first and the actual primary adapter resulting in control over the critical graphics resources being assigned to the wrong GPU. In a scenario where the iGPU is initialized first, the iGPU is correctly recognized by the operating system as the primary GPU. However, in a scenario where the dGPU is initialized first, the dGPU is incorrectly recognized by the operating system as the primary GPU. In this latter scenario, control of the critical graphics resources described above is assigned to the dGPU. Since the operating system or the dGPU is not configured to optimally control those graphics resources, or the resource will likely disappear when the dGPU is powered down, then those graphics resources and, thereby, critical functions within the computer system may not operate normally. Further, in a hybrid graphics system, the dGPU may be powered off in certain power-saving modes. In such power-saving modes, if the dGPU is the primary GPU, then the dGPU is no longer available to control the critical graphics resources, potentially resulting in a large-scale system failure.

As the foregoing illustrates, what is needed in the art is an effective mechanism to initialize the GPUs in a hybrid graphics system in a pre-determined order for the optimal control of the critical graphics resources within the system.

SUMMARY OF THE INVENTION

One embodiment of the present invention sets forth a method for controlling the initialization order of multiple graphics processing units (GPUs) in a hybrid graphics processing environment. The method includes the steps of determining that a device initialization request received from an operating system is associated with a first GPU in the hybrid graphics processing environment, determining whether a second GPU in the hybrid graphics processing environment has already been initialized, and returning an initialization failure notification to the operating system when the second GPU has not been previously initialized, or initializing the first GPU when the second GPU has been previously initialized.

One advantage of the disclosed method is that in the hybrid graphics processing environment, the dGPU is not initialized before the iGPU. As a consequence, the iGPU is always recognized as the primary GPU by the operating system, resulting in control of the critical graphics resources within the computer system properly being assigned to the iGPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
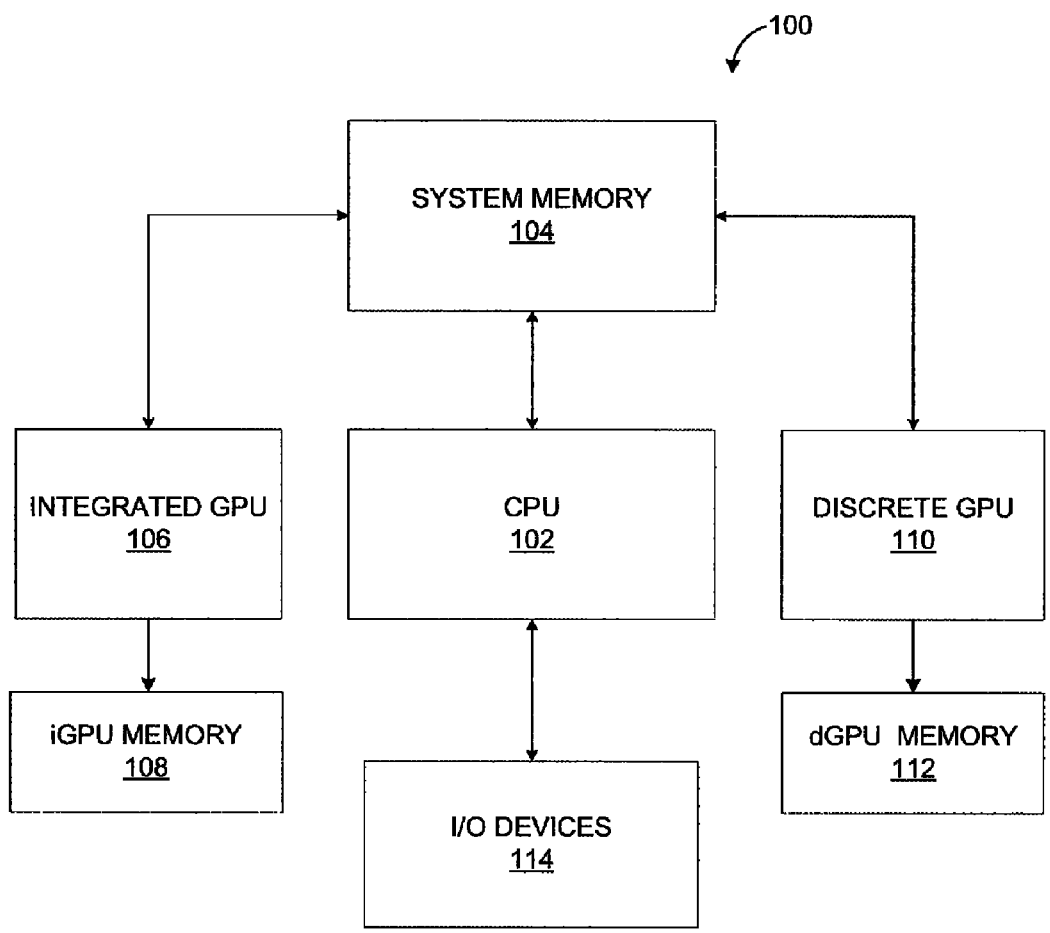
FIG. 1 illustrates a computer system configured to implement one or more aspects of the present invention.

FIG. 1 is a block diagram of a computer system 100 configured to implement one or more aspects of the invention. As shown, the computer system 100 includes a CPU 102, a system memory 104, an iGPU 106, an iGPU memory 108, a dGPU 110, a dGPU memory 112, and input/output (I/O) devices 114. The CPU 102 is connected to the system memory 104. The system memory 104 may be a hard disk drive, a RAM module, a flash drive, a database, or another type of memory unit. The system memory 104 is configured to store instructions that are read and executed by the CPU 102, the iGPU 106, and/or the dGPU 110.

The iGPU 106 and the dGPU 110 comprise a hybrid graphics processing environment. The iGPU 106 is coupled to the CPU 102 via one or more bridges that may include a memory bridge, I/O bridge, and/or switch. The iGPU 106 is also coupled to the iGPU memory 108. The iGPU 106 is configured as the primary GPU within the hybrid graphics processing environment, i.e., optimized for controlling critical graphics resources, such as backlight control, hot-key control and ACPI control. The iGPU 106 is integrated directly on the motherboard along with the CPU 102 and provides graphics processing functionality to the CPU 102. The iGPU 106 also controls the Video VGA adaptor (not shown) of the computer system 100. The iGPU 106 reads data from the iGPU memory 108 and/or from the system memory 104, where the data may include executable instructions that configure the iGPU 106 for different processing tasks. Additionally, the iGPU 106 writes data to the iGPU memory 108 or to the system memory 104, where the data may include graphics data and/or other types of data.

The dGPU 110 is similarly connected to the CPU 102 via one or more bridges that may include a memory bridge, I/O bridge, and/or switch. The dGPU 110 is coupled to the dGPU memory 112. The dGPU 110 is located on an add-in card connected to the computer system 100 via a PCIe expansion bus and slot. The dGPU 110 is configured to provide higher-precision graphics processing capabilities than the iGPU 106, such as 3D graphics rendering. The dGPU 110 reads data from the dGPU memory 112 and/or from the system memory 104, where the data may include executable instructions that configure the dGPU 110 for different processing tasks. Additionally, the dGPU 110 writes data to dGPU memory 112 and/or to the system memory 104, where the data may include graphics data or other types of data.

The one or more I/O devices 114 are also similarly connected to the CPU 102 via one or more bridges that may include a memory bridge, I/O bridge, and/or switch. The I/O devices 114 may include input devices, such as a keyboard, a mouse, a touchpad, a microphone, a video camera, a sensor, a multi-state or single-state switch, a button, a toggle, or a slider, and the like. The I/O devices 114 may be used to input data to the CPU 102, the iGPU 106, and/or the dGPU 110. The I/O devices 114 may also include output devices, such as a cathode-ray tube (CRT) monitor, a video graphics array (VGA) monitor, a liquid crystal display (LCD), or a speaker, among others, and may be used to output data processed by the CPU 102, the iGPU 106, and/or the dGPU 110.

In one embodiment, the computer system 100 is under the control of the CPU 102 and is configured to perform graphics processing as well as other operations using the iGPU 106 and the dGPU 110 as co-processors. Accordingly, the system memory 104 may include instructions that, when executed by the CPU 102, allow the CPU 102 to manage the operation of the iGPU 106 and the dGPU 110.

Figure 2:
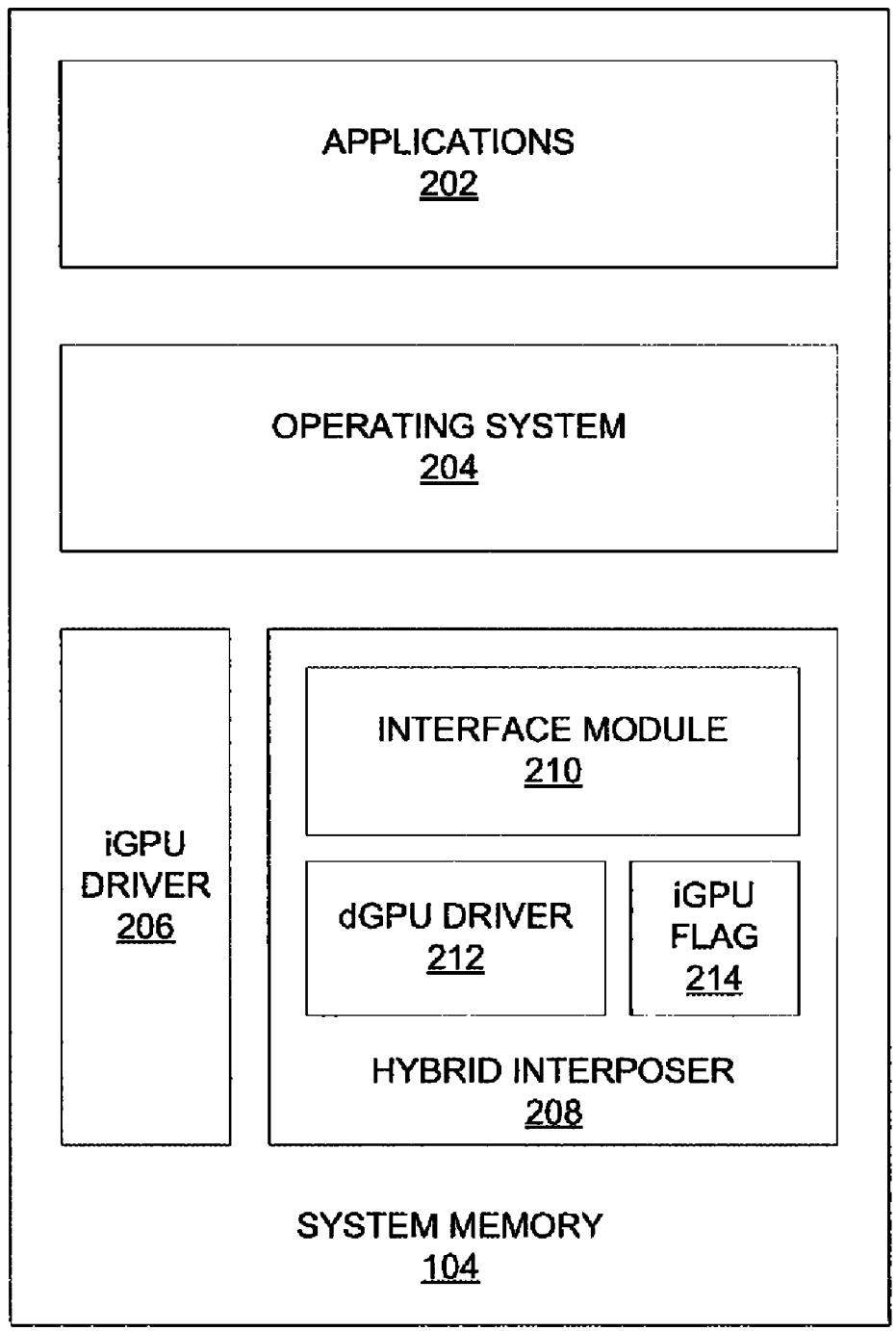
FIG. 2 illustrates a detailed view of a hybrid interposer within the system memory of FIG. 1, according to one embodiment of the present invention.

FIG. 2 illustrates a detailed view of a hybrid interposer 208 within the system memory 104 of FIG. 1, according to one embodiment of the present invention. As shown, the system memory 104 includes applications 202, an operating system 204, an iGPU driver 206 associated with the iGPU 106, and the hybrid interposer 208. The hybrid interposer 208 includes an interface module 210, a dGPU driver 212 associated with the dGPU 110, and an iGPU flag 214.

The operating system 204 is an interface between the hardware resources and the software programs within the computer system 100. Specifically, the operating system 204 is responsible for the coordination of different software programs, such as the applications 202, executing on the CPU 102 and the hardware resources within the computer system 100. When the computer system 100 is powered on, the operating system 204 initializes the different hardware resources within the computing system 100 via software drivers associated with those hardware resources.

The operating system 204 initializes the GPUs in the hybrid graphics processing environment shown in FIG. 1, the iGPU 106 and the dGPU 110, in a non-deterministic order. The operating system 204 recognizes the GPU that initializes first as the primary GPU, resulting in control over the critical graphics resources, such as backlight control, being assigned to that GPU. When initializing the iGPU 106 or the dGPU 110, the operating system 204 interfaces with the hybrid interposer 208 to coordinate the initialization process. The hybrid interposer 208 is a software program that manages the operation of the iGPU 106 and the dGPU 110 via the iGPU driver 206 and dGPU driver 212, respectively.

The interface module 210 within the hybrid interposer 208 receives device initialization requests associated with the iGPU 106 or the dGPU 110 from the operating system 204. Upon receiving a device initialization request, the interface module 210 determines whether the device initialization request is associated with the iGPU 106 or with the dGPU 110. When the device initialization request is associated with the iGPU 106, the interface module 210 transmits the device initialization request to the iGPU driver 206. The iGPU driver 206 includes initialization routines that, when executed, initialize the operation of the iGPU 106. Once the iGPU 106 is properly initialized, the interface module 210 modifies the iGPU flag 214 to indicate that the iGPU 106 has been initialized. At any given point in time, the iGPU flag 214 indicates the initialization status of the iGPU 106, i.e., whether the iGPU 106 has already been properly initialized or has not yet been initialized.

When the device initialization request is associated with the dGPU 110, the interface module 210 first determines whether the iGPU flag 214 indicates that the iGPU 106 has already been initialized. If the iGPU flag 214 indicates that the iGPU 106 has already been initialized, then the interface module 210 transmits the device initialization request to the dGPU driver 212. The dGPU driver 212 includes initialization routines that, when executed, initialize the operation the dGPU 110. However, if the iGPU flag 214 indicates that the iGPU 106 has not yet been initialized, then the interface module 210 terminates the device initialization request and transmits an initialization failure notification to the operating system 204.

In response to the initialization failure notification, the operating system 204 attempts to automatically re-initialize the dGPU 110 at a later time by transmitting another device initialization request associated with the dGPU 110 to the interface module 210. In an alternate embodiment, the operating system 204 attempts to re-initialize the dGPU 110 only when the dGPU 110 is needed to process specific graphics operations.

In such a manner, the dGPU 110 is initialized only after the iGPU 106 has previously been initialized, thereby ensuring that the iGPU 106 is recognized by the operating system as the primary GPU. Consequently, the iGPU 106 is always recognized as the primary GPU by the operating system 204, resulting in control of the critical graphics resources within the computer system 100 properly being assigned to the iGPU 106.

Figure 3:
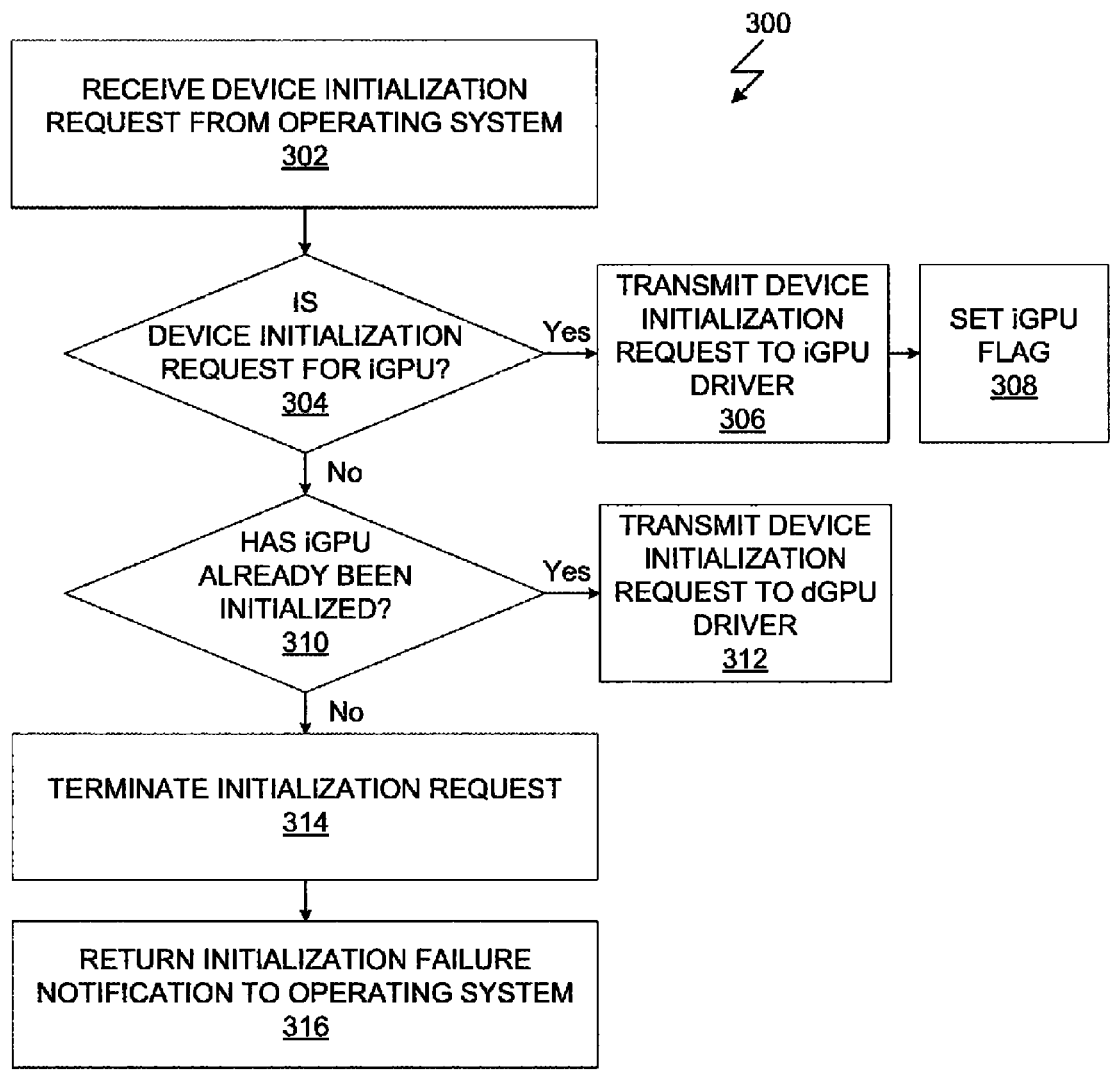
FIG. 3 is a flowchart of method steps for initializing the iGPU and the dGPU in a pre-determined order, according to one embodiment of the present invention.

FIG. 3 is a flowchart of method steps for initializing the iGPU 106 and the dGPU 110 in a pre-determined order to ensure that the iGPU 106 is recognized by the operating system 204 as the primary GPU, according to one embodiment of the present invention. Although the method steps are described in conjunction with the systems for FIGS. 1-2, persons skilled in the art will understand that any system configured to perform the method steps, in any order, is within the scope of the invention.

The method 300 begins at step 302, where the interface module 210 within the hybrid interposer 208 receives a device initialization request from the operating system 204. At step 304, the interface module 210 determines whether the device initialization request is associated with the iGPU 106.

If, at step 304, the device initialization request is associated with the iGPU 106, then the method 300 proceeds to step 306, where the interface module 210 transmits the device initialization request to the iGPU driver 206. As previously described herein, the iGPU driver 206 includes initialization routines that, when executed, initialize the operation of the iGPU 106. At step 308, the interface module 210 modifies the iGPU flag 214 to indicate that the iGPU 106 has been initialized.

If, however, at step 304, the device initialization request is associated with the dGPU 110, then the method 300 proceeds to step 310, where the interface module 210 determines whether the iGPU 106 has already been initialized. The interface module may determine the initialization status of the iGPU 106 by analyzing the status indicated by the iGPU flag 214.

If, at step 310, the iGPU 106 has already been initialized, then, at step 312, the interface module 210 transmits the device initialization request to the dGPU driver 212. As previously described herein, the dGPU driver 212 includes initialization routines that, when executed, initialize the operation of the dGPU 110.

If, however, at step 310, the iGPU 106 has not yet been initialized, then the method 300 proceeds to step 314, where the interface module 210 terminates the device initialization request. At step 316, the interface module 210 transmits an initialization failure notification to the operating system 204 indicating that the dGPU 110 has not been initialized. In response to the initialization failure notification, the operating system 204 may attempt to re-initialize the dGPU 110 at a later time.

In sum, a hybrid interposer controls the initialization order of the iGPU and the dGPU included in a hybrid graphics processing environment to ensure that the iGPU is recognized by the operating system as the primary GPU. During system start-up, the operating system transmits a device initialization request associated with the iGPU or the dGPU to the interface module in the hybrid interposer. When the device initialization request is associated with the iGPU, the interface module transmits the device initialization request to the iGPU driver for iGPU initialization. The interface module then modifies the iGPU flag to indicate that the iGPU has been properly initialized. When the device initialization request is associated with the dGPU, the interface module first determines whether the iGPU flag indicates that the iGPU has already been initialized. If the iGPU flag indicates that the iGPU has already been initialized, then the interface module transmits the device initialization request to the dGPU driver for dGPU initialization. However, if the iGPU flag indicates that the iGPU has not yet been initialized, then the interface module terminates the device initialization request and transmits an initialization failure notification to the operating system. In response to the initialization failure notification, the operating system attempts to re-initialize the dGPU at a later time. In such a manner, the dGPU is initialized only after the iGPU has previously been initialized, thereby ensuring that the iGPU is recognized by the operating system as the primary GPU.

One advantage of the disclosed technique is that, in a hybrid graphics processing environment, the dGPU is not initialized before the iGPU. As a consequence, the iGPU is always recognized as the primary GPU by the operating system, resulting in control of the critical graphics resources within the computer system properly being assigned to the iGPU.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A computer-implemented method for controlling the initialization order of multiple graphics processing units (GPUs) in a hybrid graphics processing environment, the method comprising:

determining that a device initialization request received from an operating system is associated with a first GPU in the hybrid graphics processing environment;

determining whether a second GPU in the hybrid graphics processing environment has already been initialized; and returning an initialization failure notification to the operating system when the second GPU has not been previously initialized, or initializing the first GPU when the second GPU has been previously initialized.

2. The method of claim 1, wherein the step of determining whether the second GPU has already been initialized comprises the step of analyzing a flag that indicates the initialization status of the second GPU.

3. The method of claim 1, further comprising the step of terminating the device initialization request when the second GPU has not been previously initialized.

4. The method of claim 1, wherein the step of initializing the first GPU comprises the step of transmitting the initialization request to a first driver associated with the first GPU.

5. The method of claim 1, wherein the second GPU is configured as a primary GPU within the hybrid graphics processing environment when the second GPU has been previously initialized.

6. The method of claim 5, wherein the second GPU is further configured to control critical graphics processing resources within the hybrid graphics processing environment.

7. The method of claim 1, further comprising the step of, in response to the initialization failure notification, receiving another device initialization request associated with the first GPU from the operating system.

8. The method of claim 1, wherein the hybrid graphics processing environment includes a hybrid interposer that manages the operations of the first GPU and the second GPU.

9. The method of claim 8, wherein the hybrid interposer manages the operations of the first GPU via a first driver associated with the first GPU and manages the operations of the second GPU via a second driver associated with the second GPU.

10. A non-transitory computer-readable storage medium storing instructions that, when executed by a processor, cause the processor to control the initialization order of multiple graphics processing units (GPUs) in a hybrid graphics processing environment, by performing the steps of:
    determining that a device initialization request received from an operating system is associated with a first GPU in the hybrid graphics processing environment;
    determining whether a second GPU in the hybrid graphics processing environment has already been initialized; and
    returning an initialization failure notification to the operating system when the second GPU has not been previously initialized, or
    initializing the first GPU when the second GPU has been previously initialized.

11. The non-transitory computer-readable storage medium of claim 10, wherein the step of determining whether the second GPU has already been initialized comprises the step of analyzing a flag that indicates the initialization status of the second GPU.

12. The non-transitory computer-readable storage medium of claim 10, further comprising the step of terminating the device initialization request when the second GPU has not been previously initialized.

13. The non-transitory computer-readable storage medium of claim 10, wherein the step of initializing the first GPU comprises the step of transmitting the initialization request to a first driver associated with the first GPU.

14. The non-transitory computer-readable storage medium of claim 10, wherein the second GPU is configured as a primary GPU within the hybrid graphics processing environment when the second GPU has been previously initialized.

15. The non-transitory computer-readable storage medium of claim 14, wherein the second GPU is further configured to control critical graphics processing resources within the hybrid graphics processing environment.

16. The non-transitory computer-readable storage medium of claim 10, further comprising the step of, in response to the initialization failure notification, receiving another device initialization request associated with the first GPU from the operating system.

17. The non-transitory computer-readable storage medium of claim 10, wherein the hybrid graphics processing environment includes a hybrid interposer that manages the operations of the first GPU and the second GPU.

18. The non-transitory computer-readable storage medium of claim 17, wherein the hybrid interposer manages the operations of the first GPU via a first driver associated with the first GPU and manages the operations of the second GPU via a second driver associated with the second GPU.

19. A system for controlling the initialization order of multiple graphics processing units (GPUs) in a hybrid graphics processing environment, the system comprising:
    a processor configured to:
    determine that a device initialization request received from an operating system is associated with a first GPU in the hybrid graphics processing environment,
    determine whether a second GPU in the hybrid graphics processing environment has already been initialized, and
    return an initialization failure notification to the operating system when the second GPU has not been previously initialized, or
    initialize the first GPU when the second GPU has been previously initialized.

20. The system of claim 19, further comprising a memory storing instructions that, when executed by the processor, configure the processor to:
    determine that the device initialization request is associated with the first GPU,
    determine whether the second GPU has already been initialized, and
    return the initialization failure notification to the operating system when the second GPU has not been previously initialized, or
    initialize the first GPU when the second GPU has been previously initialized.

* * * * *